UNITED STATES PATENT OFFICE 2,653,158

PREPARATION OF ACYL P-AMINO-PHENOLS

David W. Young, Roselle, and Byron M. Vanderbilt, Westfield, N. J., assignors to Standard Oil Development Company, a corporation of Delaware No Drawing. Application June 29, 1951,
Serial No. 234,448

5 Claims. (Cl. 260—404)

This invention relates to a novel process for preparing acyl p-aminophenols of higher molecular weight than acetyl p-aminophenol.

Acyl p-aminophenols of higher molecular weight than acetyl p-aminophenol have been finding ever increasing utility as anti-oxidants for relatively non-volatile organic materials which normally tend to deteriorate in storage due to undesirable oxidation reactions (e. g., see copending application Serial No. 185,326, filed September 16, 1950).

These particular acyl p-aminophenols were prepared by condensing p-aminophenol with the indicated acid anhydride or anhydrous acid.

The above-listed method suffers from certain disadvantages. P-aminophenol, an intermediate in the preparation of dyes, is difficult to obtain in a very white and pure form. The products of the condensation reaction consequently are also colored. The product is also further colored by undesirable degradation reactions which take place during the course of a reaction. The obtaining of a colored product is completely undesirable in view of the fact that the antioxidants find extensive use in clear resins and plastics which cannot tolerate colored additives.

This invention provides a method of preparing acyl p-aminophenols of higher molecular weight than acetyl p-aminophenols free of these beforementioned difficulties. The method of this invention comprises reacting acetyl p-aminophenol with an organic monocarboxylic acid containing at least four carbon atoms, removing the acetic acid formed, and recovering the higher molecular weight acyl p-aminophenol. Thus acetyl p-aminophenol, which is easily obtained in the white pure form, is reacted with a colorless or a light yellow fatty acid to form a higher molecular weight acyl p-aminophenol of a very good color.

The method of this invention is thus adapted for the preparation of acyl p-aminophenol compounds of the type illustrated in Formula I below:

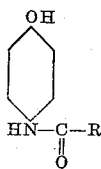

Formula I wherein R is a hydrocarbon radical having at least three carbon atoms. R can thus be an aliphatic, aromatic, alicyclic or alkaryl radical. Nuclear alkylated compounds can be prepared as well by the method of this invention.

Those compounds wherein the R is an alkyl radical having from 3 to 21 carbon atoms are especially adapted to be prepared by the process of this invention utilizing $C_4$–$C_{22}$ aliphatic monocarboxylic acids.

Among the particular compounds which thus may be utilized for the purpose of this invention are the following acids: Butyric ($C_4$); caprylic ($C_8$); capric ($C_{10}$); lauric ($C_{12}$); myristic ($C_{14}$); palmitic ($C_{16}$); stearic ($C_{18}$); undecylenic ($C_{11}$=); oleic ($C_{18}$=); linoleic ($C_{18}$==); benzoic; cyclohexylvaleric ($C_{11}$); cyclohexylcaproic; $C_8$ oxo acids; $C_9$ oxo acid; naphthenic acids. The aliphatic monocarboxylic acids derived from coconut fatty acids are especially effective for use.

The general formula for the reaction of this invention is indicated below in Equation I, wherein butyric acid is employed as a reactant:

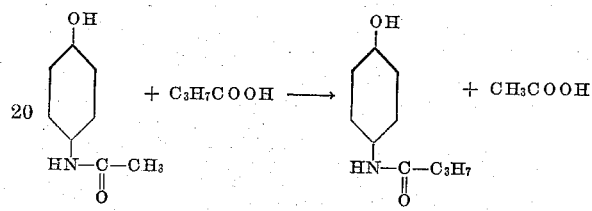

Equation I

The reactants are employed in stoichiometrical amounts, or conveniently excess fatty acid may be utilized, for the latter drives the reaction to completion much sooner and thus helps prevent degradation. The reaction itself is completed in at most about five hours. Excess fatty acid may or may not be removed from the final product, as it is the custom in certain formulations, e. g., rubber compounding, to add fatty acids to final products that contain sulfur, antioxidants, carbon black, etc.

The process of this invention is carried out preferably in the presence of an organic solvent for the reactants. The organic solvents utilized consist of substantially water immiscible and acetic acid miscible solvents, which, besides having the desired solubilizing action on the reactants, also have the property of entraining released acetic acid and/or water as explained further below, through the formation of binary or ternary azeotropes as the case may be. This consequently facilitates the removal of the acetic acid formed by the reaction. Among the particular solvents that can be utilized in this invention are the xylenes, benzene, toluene, ethylbenzene, iso-octane, and various non-olefinic hydrocarbon fractions. These solvents are inert under the reaction conditions. Other non-reactive organic solvents not of the hydrocarbon type may be also utilized, such as chlorobenzene, diethylketone, and various ethers. Mixtures of solvents may also be employed.

The solvent is conveniently utilized in an amount of from 20 to 400% based on weight of acetyl-para aminophenol.

In the non-aqueous system the reaction mixture is heated, preferably under reflux, and the acetic acid is removed as an azeotrope with the solvent. It is not necessary to employ reflux, and in that case nitrogen, steam, or non-reactive gases are passed through the mixture to help strip out the acetic acid.

It is especially preferred to carry out the process of this invention employing about 1 to 5 wt. per cent of water based on weight of acetyl-p-aminophenol as a catalyst in the solvent reaction system discussed. This amount of water decreases the reaction time, makes a final product of better color, and makes it easier to determine when the chemical reaction has been completed. The water can be added to the reaction from time to time or at the start of the run. Best results are obtained if the water is slowly added to the reaction over a period of one or two hours. The solvents listed above are capable of forming ternary azeotropes with water and the acetic acid. The ternary azeotrope is cooled and condensed and a phase separation takes place into an aqueous phase containing acetic acid and an organic phase consisting largely of the organic solvent. The acetic acid is preferentially soluble in the condensed aqueous phase, and based on the water employed and the theoretical amount of acetic acid evolved it is possible to ascertain when the reaction has gone to virtual completion. This latter visual indication does away with the necessity of titrating the overhead mixture to determine completeness of the reaction.

Use of an inorganic acid such as hydrochloric, sulfuric, or phosphoric acid is always advantageous in order to increase the rate of the reaction. When using such acid catalysts water may also be used. However, when preparing acyl-para aminophenols of good color, it is generally advantageous not to employ a mineral acid catalyst.

The temperature of the reaction is largely maintained about that of the azeotropes formed, i. e., the binary or ternary azeotropes, depending upon whether the aqueous or non-aqueous systems are utilized. A typical ternary azeotrope system and temperature is: xylene, water, acetic acid, B. P. 73° C.

In both the aqueous and non-aqueous systems the reaction mixture, after the taking off overhead of the more volatile components, consists of the high molecular weight acyl p-aminophenol product and any unreacted monocarboxylic acid higher boiling than acetic acid. The solvent is removed by simple distillation. Unreacted acid is removed if desired by washing with solvents or by fractional distillation.

The following examples illustrate this invention:

*Example I.—Preparation of lauroyl para-aminophenol*

One mole of acetyl p-aminophenol was reacted with two moles of coconut fatty acids which contained principally lauric acid, a C12 aliphatic monocarboxylic acid. One mole of toluene was employed as a solvent. After five hours at the azeotropic distillation temperature of 73° C. one mole of acetic acid has been removed as an azeotrope. The product was cooled, removed from the reflux setup, and then batch distilled to remove the toluene solvent. A very light colored product with a melting point of 90° C. was obtained in almost 100% yield.

Excess coconut fatty acid was removed by washing with cold toluene. Upon recrystallization from isopropyl alcohol a pure white antioxidant was obtained with a melting point of 109° C. The yield based on the acetyl p-aminophenol employed was 88%.

*Example II.—Preparation of N-stearoyl p-aminophenol*

One mole of acetyl-p-aminophenol was added to a 2 neck 1 l. Pyrex flask. To this was added one mole of stearic acid and 200 ml. of xylene. The mixture was heated under reflux for eight hours to remove acetic acid as azeotrope. After eight hours 98% of acetic acid was removed. Product filtered to remove xylene. Yield of white N-stearoyl p-aminophenol was 92% by weight. The melting point of product was 129° C. This product upon analysis had a N content of 3.78%. The calculated theoretical nitrogen content for N-stearoyl para-aminophenol is 3.79%. The sample was quite light stable and a good anti-oxidant for synthetic rubber.

*Example III.—Effect of employing water as a promoter*

The effect of utilizing water as a promoter in the reaction mixture is illustrated in the following table:

| Run # | Time of Reaction, Hrs. | Wt. of Lauric Acid, g. | Wt. of acetyl p-aminophenol, g. | Ml. xylene Used | Wt. of $H_2O$ Used, g. | Percent yield of Product of Good Color |
|---|---|---|---|---|---|---|
| I | 5 | 50 | 37.5 | 50 | None | 62 |
| II | 2 | 50 | 37.5 | 50 | 5 | 98 |
| III | 5 | 100 | 37.5 | 50 | None | 88 |
| IV | 2 | 100 | 37.5 | 50 | 5 | 98 |

It should be noted from these data that the utilization of water in runs II and IV gave a very large increase in yield in an appreciably shorter time than corresponding runs I and III respectively, which were conducted in the absence of water promoter.

There are several distinct advantages inherent in the process of this invention. Among these is the fact that the reaction is straightforward and relatively rapid and the acetic acid is readily removed. Product degradation is thus kept at a minimum. In addition, white products are obtained free of undesirable colors. Other advantages will be apparent to those skilled in the art.

It is to be understood that the invention is not limited to the specific examples which have been offered merely as illustrations, and that modifications may be made in equipment and conditions within the range specified without departing from the spirit of this invention.

What is claimed is:

1. A process for the preparation of an acyl-p-amino-phenol corresponding to the general formula

wherein R is an alkyl radical having from 3 to 21 carbon atoms, which comprises reacting acetyl p-aminophenol with an aliphatic monocarboxylic acid having from 4 to 22 carbon atoms, in an organic solvent for the reactants, said organic solvent being water immiscible-acetic acid miscible and capable of azeotroping with acetic acid, and withdrawing a vaporous mixture of acetic acid-organic solvent azeotrope from the reaction system.

2. A process for the preparation of lauroyl para-aminophenol which comprises reacting acetyl p-aminophenol with lauric acid in the presence of toluene as a solvent, and withdrawing a vaporous acetic acid-toluene azeotrope leaving the lauroyl para-aminophenol product.

3. A process for the preparation of an acyl-p-aminophenol corresponding to the general formula

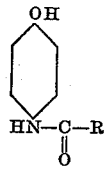

wherein R is an alkyl radical having from 3 to 21 carbon atoms, which comprises reacting acetyl p-aminophenol with an aliphatic mono- carboxylic acid having from 4 to 22 carbon atoms in the presence of an organic, water immiscible-acetic acid miscible solvent for the reactants and water as a promoter for the reaction, and withdrawing a vaporous mixture of organic solvent-acetic acid-water azeotrope from the reaction mixture.

4. A process for the preparation of lauroyl-para-aminophenol, which comprises reacting acetyl p-aminophenol with lauric acid utilizing xylene as a solvent and water as a promoter, removing a vaporous xylene-water-acetic acid azeotrope from the reaction mixture leaving the lauroyl-para-aminophenol product.

5. The process of claim 3 in which the water is employed in an amount of about 1 to 5 weight per cent based on the acetyl p-aminophenol.

DAVID W. YOUNG.
BYRON M. VANDERBILT.

References Cited in the file of this patent

Berichte, Deutsche Chemische Gesellschaft, 1906 (vol. 39), pages 3348, 3356.